(12) United States Patent
Kwon et al.

(10) Patent No.: US 9,003,322 B2
(45) Date of Patent: Apr. 7, 2015

(54) METHOD AND APPARATUS FOR PROCESSING MULTI-TOUCH INPUT AT TOUCH SCREEN TERMINAL

(75) Inventors: Won-Seok Kwon, Gyeonggi-do (KR); Jin Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/370,549

(22) Filed: Feb. 10, 2012

(65) Prior Publication Data

US 2012/0210270 A1 Aug. 16, 2012

(30) Foreign Application Priority Data

Feb. 10, 2011 (KR) ........................ 10-2011-0011772

(51) Int. Cl.
 G06F 3/048 (2013.01)
 G06F 3/0485 (2013.01)
 G06F 3/0488 (2013.01)

(52) U.S. Cl.
 CPC .......... *G06F 3/0485* (2013.01); *G06F 3/04883* (2013.01); *G06F 2203/04104* (2013.01)

(58) Field of Classification Search
 USPC ................... 715/777, 781, 863; 345/156–184
 See application file for complete search history.

(56) References Cited

U.S. PATENT DOCUMENTS

| | | | |
|---|---|---|---|
| 7,479,948 B2 | 1/2009 | Kim et al. | |
| 2006/0125803 A1* | 6/2006 | Westerman et al. | 345/173 |
| 2007/0097093 A1* | 5/2007 | Ohshita et al. | 345/173 |
| 2008/0036743 A1* | 2/2008 | Westerman et al. | 345/173 |
| 2010/0095240 A1* | 4/2010 | Shiplacoff et al. | 715/784 |
| 2010/0214237 A1* | 8/2010 | Echeverri et al. | 345/173 |
| 2010/0313125 A1* | 12/2010 | Fleizach et al. | 715/702 |
| 2011/0078624 A1* | 3/2011 | Missig et al. | 715/802 |
| 2011/0179387 A1* | 7/2011 | Shaffer et al. | 715/835 |
| 2012/0019452 A1* | 1/2012 | Westerman | 345/173 |
| 2012/0019453 A1* | 1/2012 | Westerman | 345/173 |
| 2012/0062489 A1* | 3/2012 | Andersson et al. | 345/173 |
| 2012/0092277 A1* | 4/2012 | Momchilov | 345/173 |

\* cited by examiner

*Primary Examiner* — Kieu Vu
*Assistant Examiner* — Joy M Weber
(74) *Attorney, Agent, or Firm* — The Farrell Law Firm, P.C.

(57) ABSTRACT

The present invention provides a method for processing multi-touch input in a touch screen terminal in which application programs in form of subordinate sub-windows are displayed by detecting a movement and the number of touch flickings; and switching between sub-windows opened in the corresponding application program or between the application programs depending on the number of touch flickings.

27 Claims, 11 Drawing Sheets

Yahoo! News 09:20 AM

NEWS SEARCH

Obama urges U.S. to pull together after Arizona rampage

By Steve Holland Steve Holland – Mon Jan 10, 9:20 pm ET

WASHINGTON (Reuters) – President Barack Obama mourned victims of an Arizona gunman on Monday and steered clear of a debate on whether harsh political rhetoric inspired the attack on a congresswoman.

As many members of his own Democratic Party decried the often rabid level of political discourse in the country, Obama said he is grieving for the victims and their families and honoring those who apparently prevented more deaths.

Obama will travel to Arizona on Wednesday to attend a memorial service for the victims of the shooting attack on Representative Gabrielle Giffords in Tucson, a U.S. official said. Victims included a federal judge and a 9-year-old girl.

1/5

(B)

Yahoo! News 09:20 AM

NEWS SEARCH

A bell tolled three times as an estimated 300 White House staff members gathered for the somber occasion.

"Obviously, all of us are still grieving and in shock from the tragedy that took place," Obama told reporters during a subsequent picture-taking session with visiting French President Nicolas Sarkozy.

"Gabby Giffords and others are still fighting to recover. Families are still absorbing the enormity of their losses," he said.

While no motive has been apparent in the shootings, some politicians and pundits have been quick to cite the political rhetoric in a country with loose gun laws.

The rampage thrust Obama into a chief grieving role for a second time since he took power two years ago. In November 2009, 13 people were killed at Fort Hood, Texas, in a shooting spree.

METHOD AND APPARATUS FOR PROCESSING MULTI-TOUCH INPUT AT TOUCH SCREEN TERMINAL

CLAIM OF PRIORITY

This application claims the benefit under 35 U.S.C. §119(a) of a Korean patent application filed in the Korean Intellectual Property Office on Feb. 10, 2011 and assigned Serial No. 10-2011-0011772, the entire disclosure of which is hereby incorporated by reference.

BACKGROUND OF THE INVENTION

1. Field of the Invention

The present invention relates to a method and an apparatus for processing multi-touch input in a touch screen terminal, in particular to a method and an apparatus for processing input by multi-touch flicking.

2. Description of the Related Art

Portable terminals such as mobile terminals, electronic notebooks, personal multi-terminals and the like have been becoming daily necessities in the modern life.

Portable terminals are means for providing various services based on the telecommunication network such as internet. Such service may include electronic mail, remote computer connection, file transfer, internet information searching, internet talk and conversation, electronic bulletin board, hypertext information browsing and the like. Recent portable terminals adopt touch-screen method to enable the user to utilize service easily.

In general, a user may search necessary information on internet with a browser, which is a client application program used for searching necessary information on internet. Recently, such browser has become tab-browsing which provides browsing method to enable a user to open a plural of windows with a tab and to move between windows by clicking the tab.

Further, portable terminals may support multi-tasking in that a plural of application programs can be implemented at the same time. Under such circumstances, a user has to switch to the window of the browser among the various application programs by clicking the tab one by one for browsing the window which is cumbersome.

SUMMARY OF THE INVENTION

An aspect of the present invention is to provide a method and an apparatus for processing input depending on the number of touch flickings in a touch-screen terminal.

Other aspect of the present invention is to provide a method and an apparatus for switching to the corresponding window depending on a movement and a number of touch flickings detected during a tab-browsing mode in a touch-screen terminal.

Another aspect of the present invention is to provide a method and an apparatus for switching to a corresponding application program depending on a movement and a number of touch flickings detected while multi-tasking in a touch-screen terminal.

Another aspect of the present invention is to provide a method and an apparatus for processing i the amounts or speed of scrolling the content shown on the screen is proportional according to a movement and the number of multi-touch flickings on a touch-screen terminal.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIG. 4B to FIG. 4D illustrate screens in which to scroll the contents shown on web-browser window according to an exemplary embodiment of the present invention.

DETAILED DESCRIPTION

Exemplary embodiments of the present invention will be described herein below with reference to the accompanying drawings. For the purposes of clarity and simplicity, well-known functions or constructions are not described in detail as they would obscure the invention in unnecessary detail. Also, the terms used herein are defined according to the functions of the present invention. Thus, the terms may vary depending on user's or operator's intension and usage. That is, the terms used herein must be understood based on the descriptions made herein.

A purpose of the present invention is to provide a method and an apparatus for processing input depending on the number and movement of touch flickings detected in a touch-screen terminal.

Figure 1:
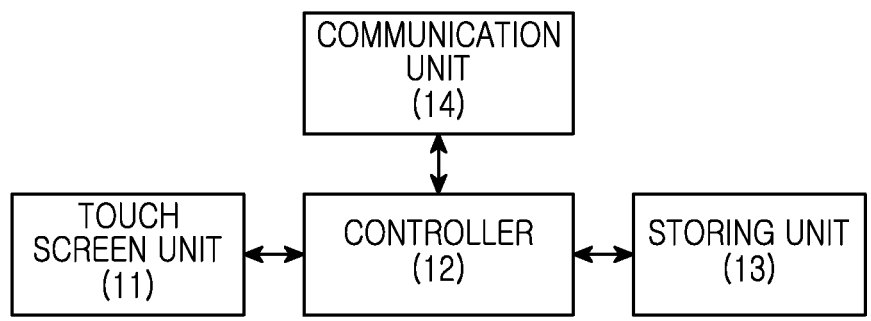
FIG. 1 is a block diagram of a touch screen terminal according to an exemplary embodiment of the present invention.

FIG. 1 is a block diagram of a touch screen terminal according to an exemplary embodiment of the present invention.

Referring to FIG. 1, a touch screen terminal according to the present invention includes a touch-screen unit 11 for input and output, a store unit 13 for storing data, a communication unit 14 for communicating, and a controller 12 for controlling overall operation of the touch screen terminal.

In operation, the touch-screen unit 11 outputs an input signal generated by a touch to the controller 12, and data corresponding to the input signal is displayed according to the instruction of the controller 12. The store unit 13 stores prescribed programs to control the overall operation of the touch-screen terminal as well as various data input and output on implementing the controlling operation of the touch-screen terminal. The communication unit 14 transmits, receives and treats wire signal or wireless signal. The controller 12 controls the overall operation of the touch-screen terminal.

Hereinafter, the method of processing input depending on the number of touch flickings of the controller 12 will be detailed in below, referring to the drawings.

Figure 2A:
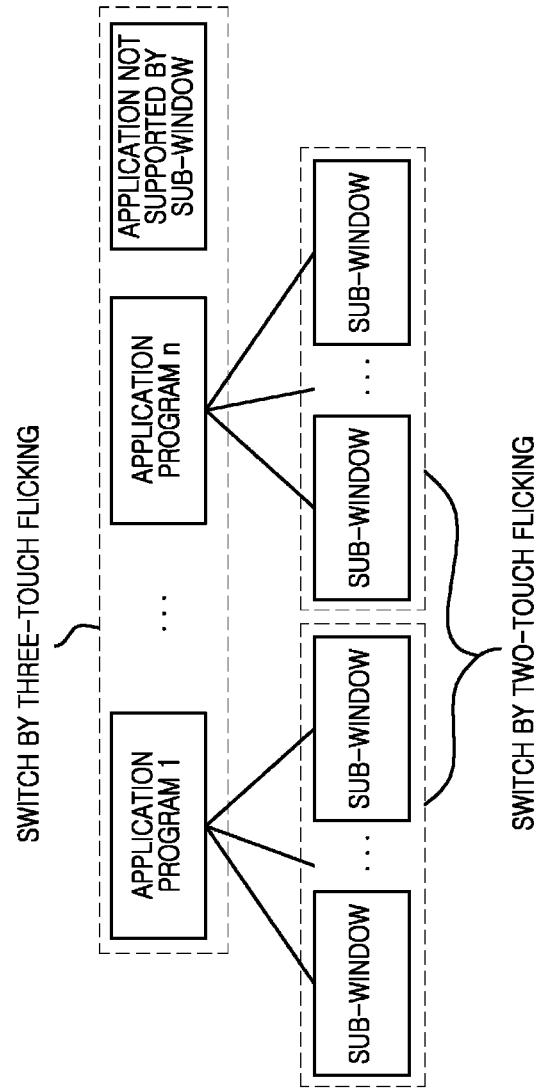
FIG. 2A is a drawing illustrating hierarchy switching window depending on the number of touch flickings according to an exemplary embodiment of the present invention.

FIG. 2A is a drawing illustrating a hierarchy of switching windows depending on the number of touch flickings according to an exemplary embodiment of the present invention.

Referring to FIG. 2A, the touch-screen terminal of the present invention may implement various application programs at the same time. The application program can be classified on the basis of whether it can open sub-window or not. For example, a browser may have a tab-window as a sub-window. The tab-window is a window with tabs so that a user can move to the desired window for browsing by clicking the tab.

According to an embodiment of the present invention, the hierarchy to which a window switches varies depending on the number of touch flickings. The touch flickings means an action to push finger(s) while touching a touch-screen.

According to an embodiment of the present invention, the occurrence of three-touch flickings makes switch as application program unit. And also, if two-touch flickings occurs, the switch of sub-window unit opened in the application program and browsing at present is made.

In the above-mentioned description, only the case in that one to three-touch flickings occurs for illustrative purposes, but the same principle as the case may be applied to equal or more than four-touch flickings. For example, one application program may have subordinate sub-window in hierarchy and the above mentioned method can be applied to.

Figure 2B:
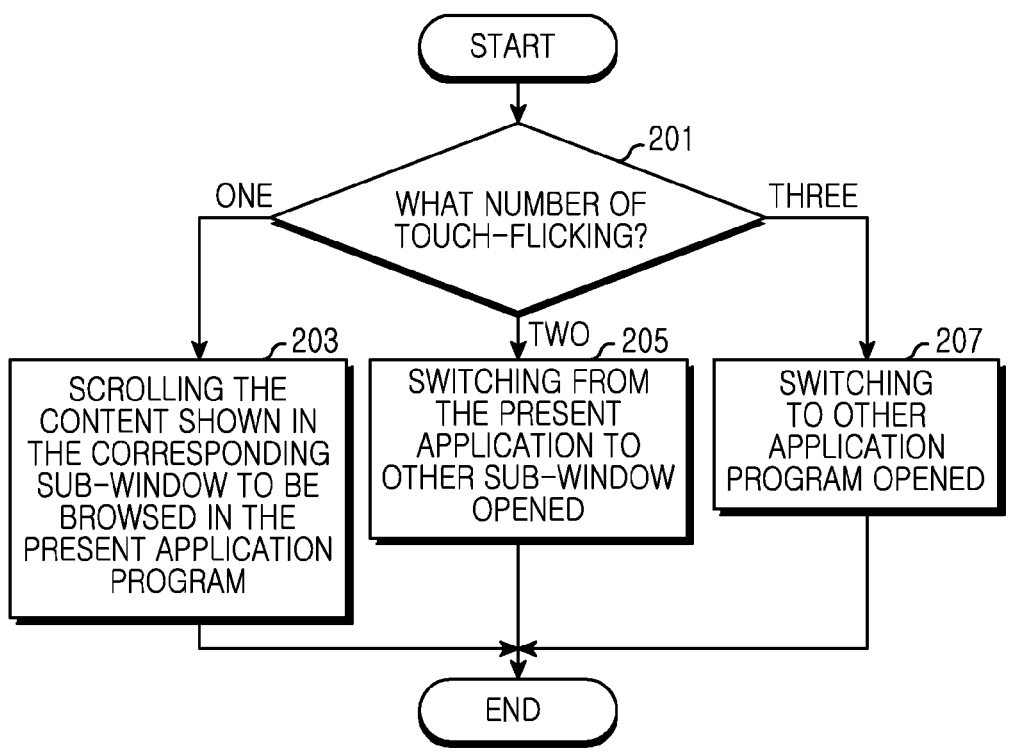
FIG. 2B is a flowchart illustrating procedure for switching window depending on the number of touch flickings according to an exemplary embodiment of the present invention.

FIG. 2B is a flowchart illustrating procedure for switching window depending on the number of touch flickings according to an exemplary embodiment of the present invention.

Referring to FIG. 2B, the controller 12 verifies the movement of a number of touch flickings 201.

If one-touch flickings occurs, the controller 12 scrolls the content that is browsed in the present application program and displayed on the corresponding sub-window in the direction of the touch flickings 203. If two-touch flickings occurs, the controller 12 makes switch to other sub-window opened in the present application program 205. If three-touch flickings occurs, the controller 12 makes switch to other application program that is opened 207.

Figure 3A:
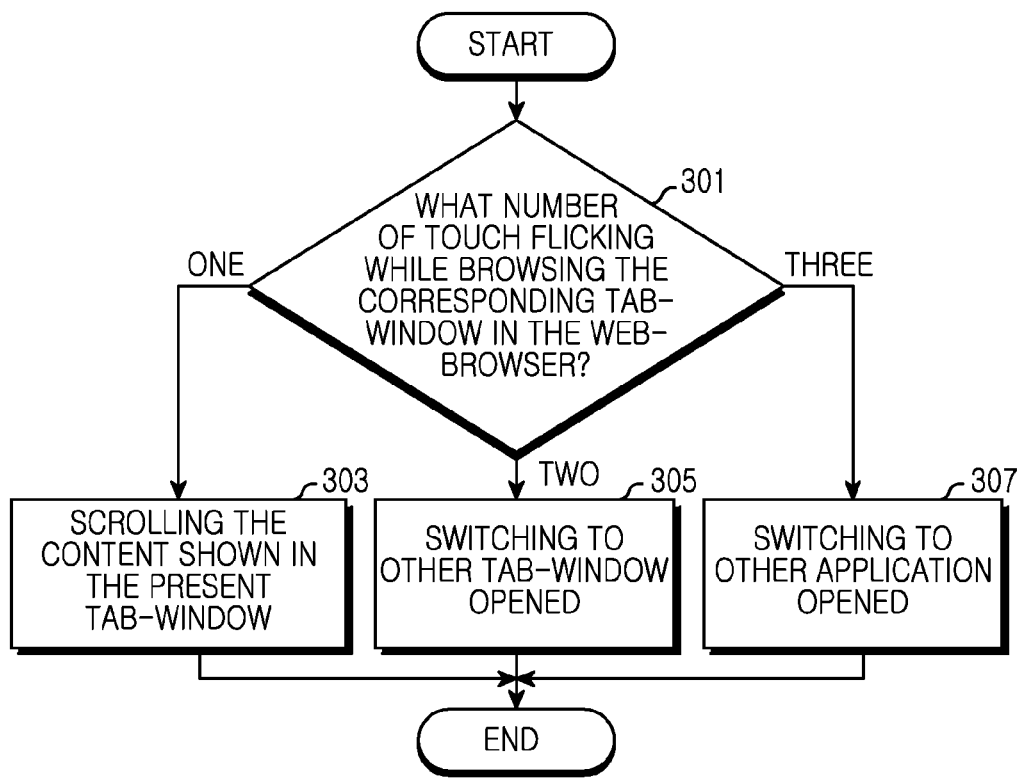
FIG. 3A is a flowchart illustrating procedure for switching window according to the number of touch flickings while browsing a web-browser according to an exemplary embodiment of the present invention.

FIG. 3A is a flowchart illustrating procedure for switching window according to the number of touch flickings while browsing a web-browser according to an exemplary embodiment of the present invention.

Figure 3B:
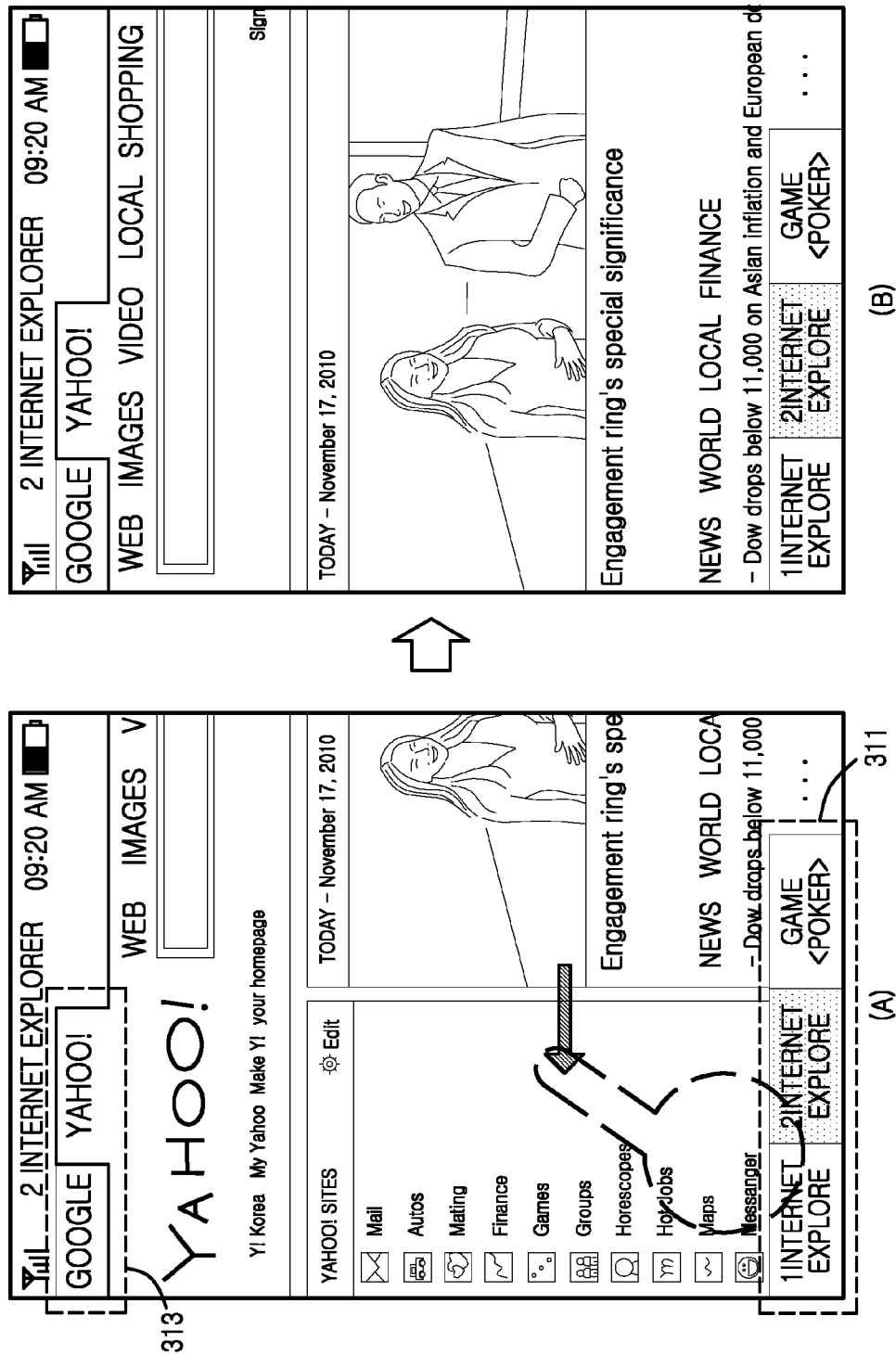
FIG. 3B to 3D is a flowchart illustrating procedure for switching window depending on the number of touch flickings while browsing a web-browser according to an exemplary embodiment of the present invention.

Before explaining the embodiment in FIG. 3A, a user may implement a plural of application programs, which will be disclosed later as shown in FIG. 3B. The application program may be a browser, a game and the like. As shown in FIG. 3A, the browser provides tab-browsing. Namely, the user can move to a sub-window intending to browse as he or she opens various sub-windows (termed as 'tab-window' in below) with their own tab and clicks the tab. The tab-window may show the web page of corresponding web-site or a web page hyper-linked to other web-page. It is assumed that the present user browses the corresponding tab-window on the browser.

Referring to FIG. 3A, the controller 12 verifies the number of touch flickings on browsing the corresponding tab-window on the web-browser 301.

If a movement of one touch flickings is detected, the controller 12 scrolls the content shown in the present tab-window in the direction of the touch flickings 303.

And also, if a movement of two-touch flickings is detected, the controller 12 makes switch to other tab-window that is opened 305. If there is no opened tab-window, the two touch flickings makes no action or the controller 12 can scroll the content shown in the present tab-window in the corresponding direction as one touch flicking is detected.

Furthermore, if a movement of three-touch flickings is detected, the controller 12 makes switch to other application program that is opened 307. If there is no opened application program, the three touch flickings makes no action or the controller 12 can make switch to other tab-window that is opened as two-touch flickings is detected.

Figure 3C:
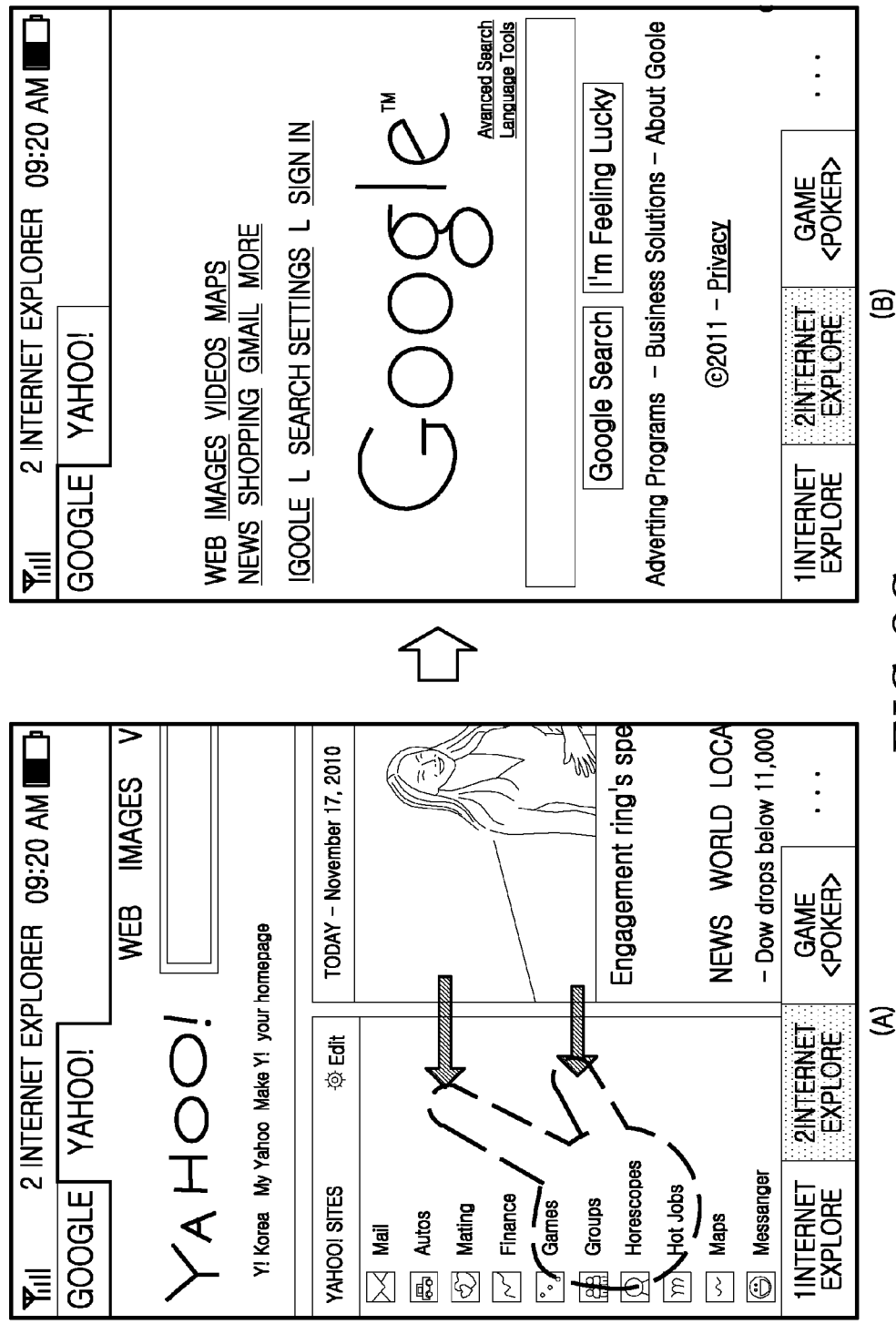
Figure 3D:
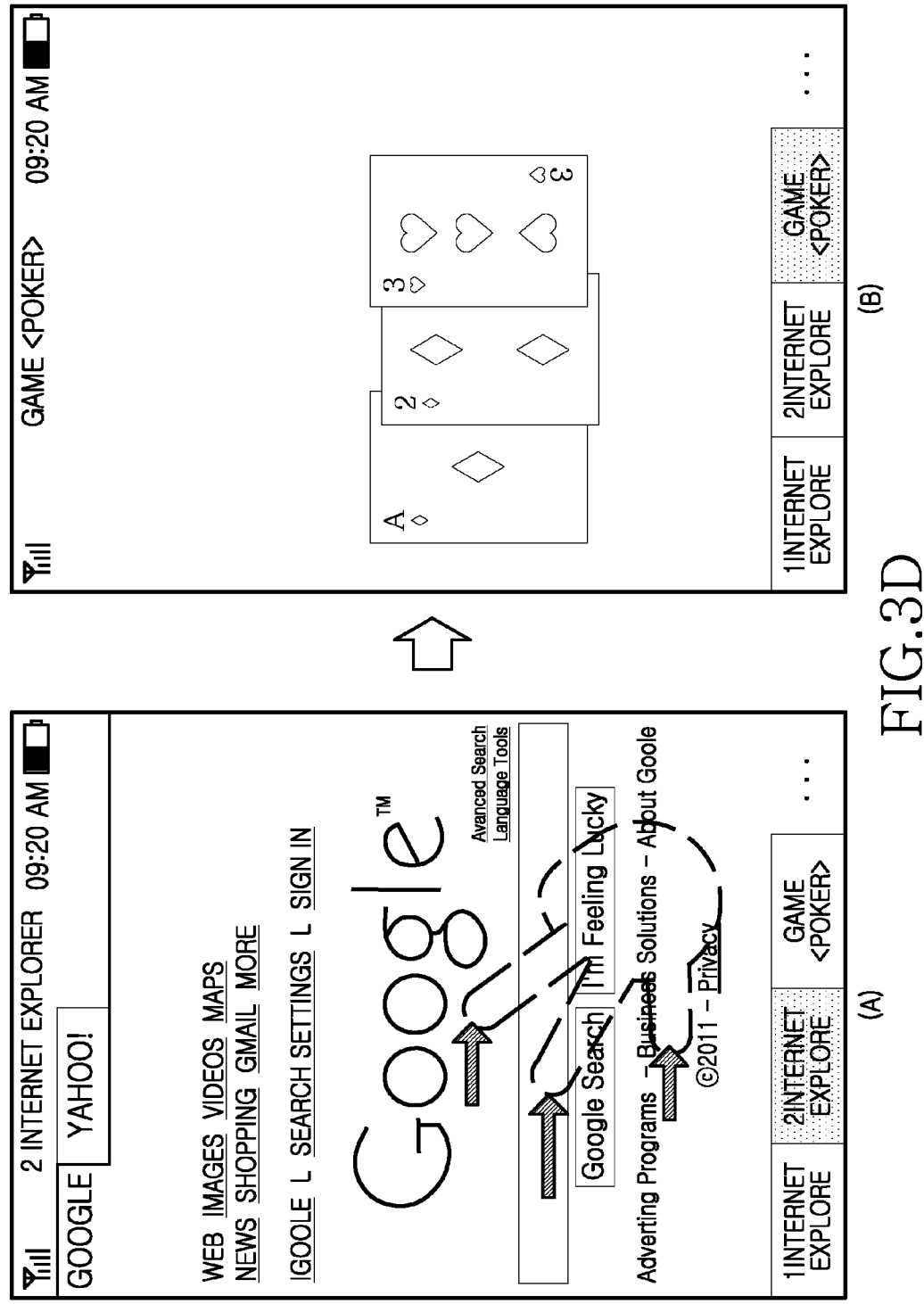

FIG. 3B to 3D is a flowchart illustrating procedure for switching window depending on the number of touch flickings while browsing a web-browser according to an exemplary embodiment of the present invention.

Referring to FIG. 3B to 3D, a user implements various application programs as multi-tasking. For example, it is assumed that opened application programs are two browsers (for example; 1 internet explorer, 2 internet explorer) and a game (for example: Game<Poker>). The touch-screen terminal informs what program is opened presently by setting as tab 311 and the user selects the tab by touch to make switch to the corresponding application program. Also, the browser provides tab-browsing. Namely, the user may open various sub-windows (tab-window) with their own tab to click the tab and may move to the tab-window intending to browse 313. For example, the tab-window can show the web-page of corresponding web-site or can show a web-page hyper-linked to other web-page. For convenience sake, it may be assumed that a user is browsing the corresponding tab-window on the second browser.

Referring to FIG. 3B, if the user touch flickings to the left with one finger (a), the controller 12 scrolls the content shown in the tab-window that is being browsed at present (b). Namely, one-touch flickings makes scroll in the touch flickinged direction.

Referring to FIG. 3C, if the user touch flickings are moved to the left with two fingers (a) (in the direction of the other tab), the controller 12 makes a switch to other tab-window that is opened on the browser window (b). Namely, two-touch flickings makes a switch between tab-windows opened in the browser.

Referring to FIG. 3D, if the user touch flickings to the left or right with three fingers (a), the controller 12 makes a switch to other application program that is opened (b). As shown in FIG. 3D, if three touch flickings occurs to the right, the controller 12 switches the browser window to a Game<Poker> window (b).

If the corresponding application program can't implement scrolling, one-touch flicking makes no action. Also, if the corresponding application program can't support tab-window, two-touch flickings makes no action or makes scrolling as if one touch flicking occurred.

Figure 4A:
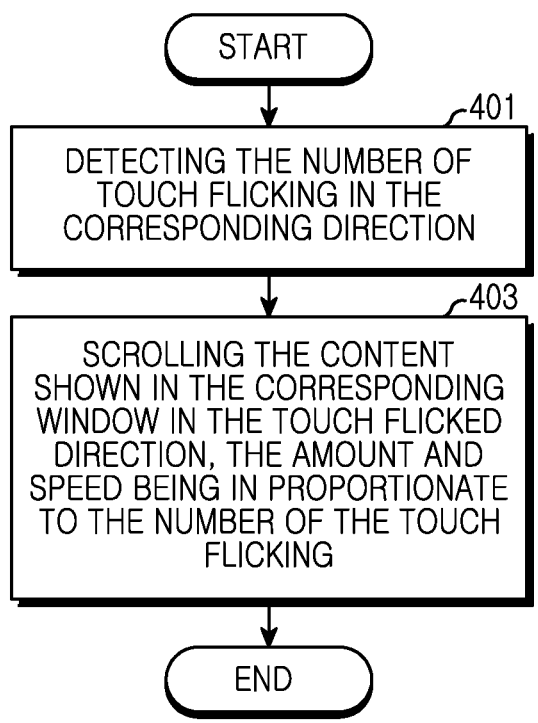
FIG. 4A is a flowchart illustrating procedure of scroll depending on the number of touch flickings according to an exemplary embodiment of the present invention.

FIG. 4A is a flowchart illustrating procedure of scroll depending on the number of touch flickings according to an exemplary embodiment of the present invention.

Referring to FIG. 4A, the controller 12 senses occurrence of touch flickings in the corresponding direction and the number of touch flickings 401. Then, the controller 12 scrolls the content shown in the corresponding window in a movement direction of the touch flickings, making the amounts or speed of the scrolling proportionate or proportional to the number of touch flickings 403 detected. For example, a faster scrolling can be realized as the number of touch flickings detected is higher.

Figure 4B:
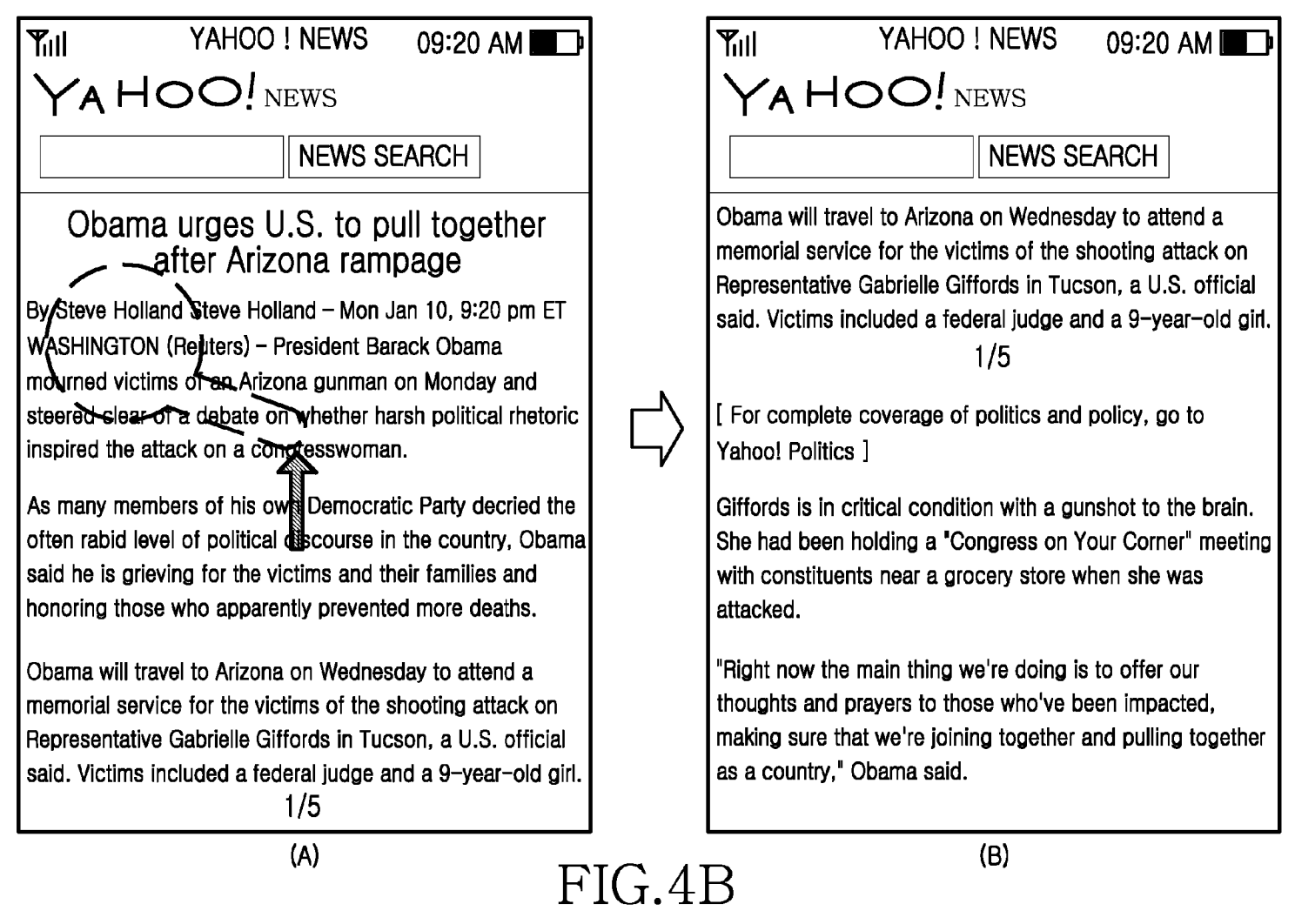
Figure 4C:
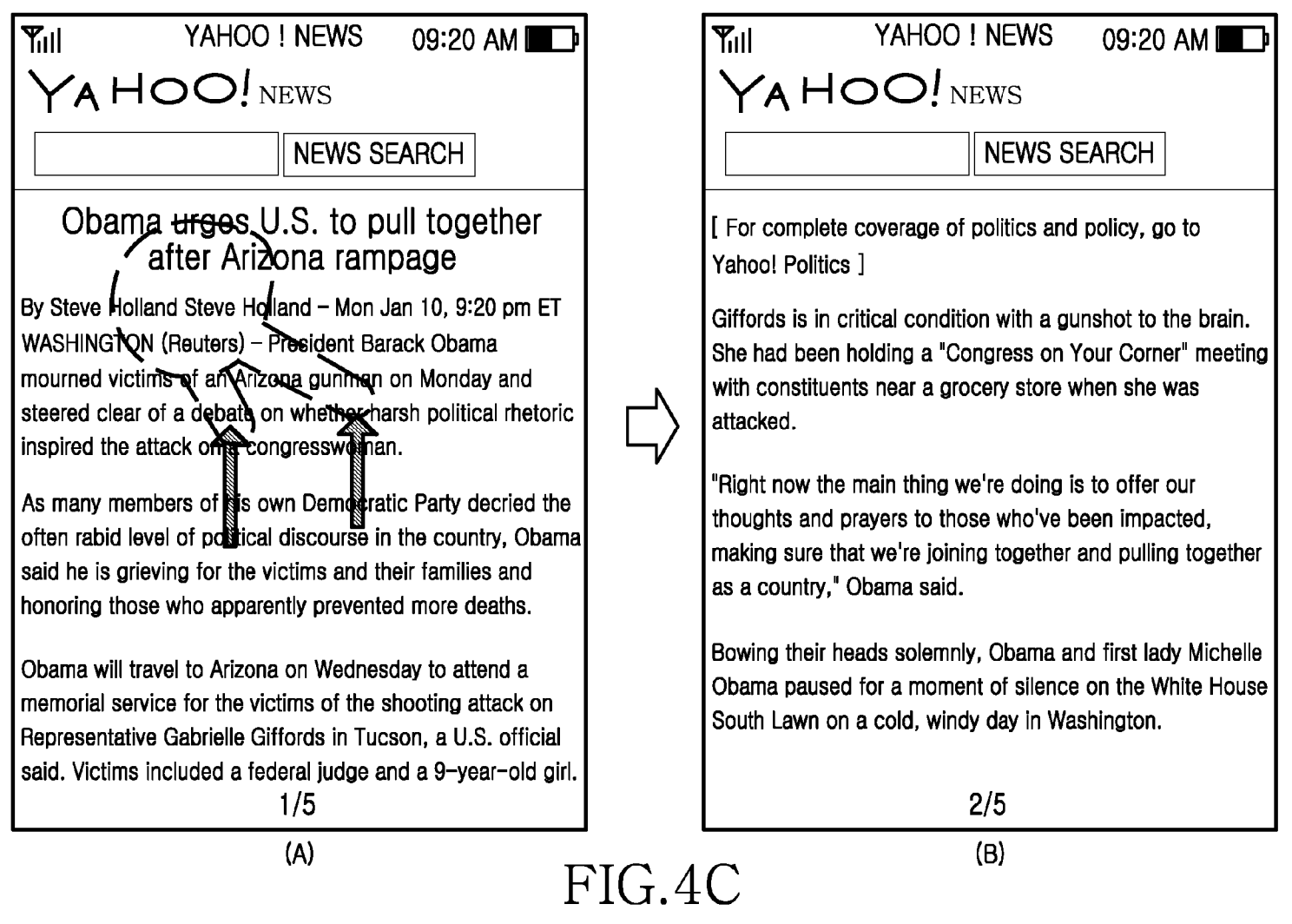

FIG. 4B to FIG. 4D illustrate screens in which to scroll the contents shown on web-browser window according to an exemplary embodiment of the present invention. It is assumed that a user browses a web-page shown in the web-browser. The user can read all the content of the web-page with scrolling.

Referring to FIG. 4B, if the user makes touch flickings upward with one finger (a), the content of the web-page is scrolled upward as much as predetermined amount (b). Referring to FIG. 4C, if the user make touch flickings upward with two fingers (a), the content of web-page is scrolled upward more than the case with one touch flicking (b). Referring FIG. 4D, the user makes touch flickings with three fingers (a), the content of web-page is scrolled upward more than the case with two touch flickings (c). Thus, the amount of scroll increases in proportion to the number of touch flickings. In addition, the speed of scroll may increase in proportion to the number of touch flickings at the same time. For example, when switched from first page to second page, three touch flickings makes a switch more rapidly than one touch flicking. In the above-explanation, though the example was limited to only one to three touch flickings, however, the teachings of above principle may be apply to more than three touch flickings.

In conclusion, the method and the apparatus for processing multi-touch input in a touch-screen terminal according to the present invention can make an easy switch to a corresponding window and make the content shown in the window be scrolled variably and easily according to the movement and the number of the touch flickings detected on the touch screen.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method for a touch screen, the method comprising:
  displaying a window of a first application program on the touch screen;
  detecting a flicking of one or more fingers in the displayed window of the first application program on the touch screen;
  determining a number of fingers in the detected flicking of one or more fingers in the displayed window of the first application program on the touch screen; and
  if the determined number of fingers in the detected flicking is four or more:
    determining whether a second application program is running;
    if it is determined that a second application is running, switching from the displayed window of the first application program to a window of the second application program; and
    if it is determined that a second application is not running, performing a default action, wherein the default action comprises at least one of scrolling content in the displayed window of the first application program, switching from a currently-displayed sub-window of the first application program to a not-currently-displayed sub-window of the first application program, and performing no action.

2. The method of claim 1, further comprising:
  if the determined number of fingers in the detected flicking is one, scrolling content shown in the displayed window of the first application program in a direction of movement of the one touch flicking.

3. The method of claim 1, further comprising:
  if the determined number of fingers in the detected flicking is two, switching from a currently-displayed sub-window of the displayed first application program to a not-currently-displayed sub-window of the displayed first application program.

4. The method of claim 3, wherein at least one of the sub-windows comprises a tab-window.

5. The method of claim 1, wherein the flicking of one or more fingers in the displayed window of the first application program on the touch screen comprises at least one of a swipe and a drag.

6. An apparatus, comprising:
  a touch screen; and
  a controller which:
    controls the touch screen to display a window of a first application program, the first application program being one presently running on the apparatus;
    if a flicking of one or more fingers is detected in the displayed window of the first application program running on the apparatus, determines a number of fingers in the detected flicking of one or more fingers in the displayed window of the first application program;
    if the determined number of fingers detected in the flicking is four or more, determines whether a second application program is running;
    if the determined number of fingers is four or more and it is determined that a second application program is running, controls the touch screen to switch from the displayed window of the first application program to a window of the second application program; and
    if the determined number of fingers detected in the flicking is four or more and it is determined that a second application is not running, controls the apparatus to perform a default action, wherein the default action comprises at least one of scrolling content in the displayed window of the first application program, switching from a currently-displayed sub-window of the first application program to a not-currently-displayed sub-window of the first application program, and performing no action.

7. The apparatus of claim 6, wherein the controller, if the determined number of fingers detected in the flicking is one, controls the touch screen to scroll content shown in the displayed window of the first application program in a direction of movement of the flicking.

8. The apparatus of claim 6, wherein the controller, if the determined number of fingers detected in the flicking is two, controls the touch screen to switch from a currently-displayed sub-window of the displayed first application to a not-currently-displayed sub-window of the first application.

9. The apparatus of claim 8, wherein at least one of the sub-windows comprises a tab-window.

10. The apparatus of claim 6, wherein the flicking of one or more fingers in the displayed window of the first application program on the touch screen comprises at least one of a swipe and a drag.

11. A method for a touch screen of a portable terminal, the method comprising:
 displaying a window of a first application program on the touch screen;
 detecting a flicking of one or more fingers in the displayed window of the first application program on the touch screen;
 determining a number of fingers in the detected flicking of one or more fingers in the displayed window of the first application program on the touch screen;
 when the determined number of fingers in the detected flicking is one, scrolling content in the displayed window of the first application program; and
 when the determined number of fingers in the detected flicking is four or more:
  determining whether a second application program is running;
  if it is determined that a second application is running, switching from the displayed window of the first application program to a window of the second application program; and
  if it is determined that a second application is not running, performing a default action, wherein the default action comprises at least one of scrolling content in the displayed window of the first application program, switching from a currently-displayed sub-window of the first application program to a not-currently-displayed sub-window of the first application program, and performing no action.

12. The method of claim 11, further comprising:
 when the determined number of fingers in the detected flicking is two, switching from a currently-displayed sub-window of the first application program to a not-currently-displayed sub-window of the first application program.

13. The method of claim 12, wherein at least one of the sub-windows comprises a tab-window.

14. The method of claim 11, wherein the flicking of one or more fingers in the displayed window of the first application program on the touch screen comprises at least one of a swipe and a drag.

15. An apparatus, comprising:
 a touch screen; and
 a controller which:
  controls the touch screen to display a window of a first application program, the first application program being one presently running on the apparatus;
  if a flicking of one or more fingers is detected in the displayed window of the first application program running on the apparatus, determines a number of fingers in the detected flicking of one or more fingers in the displayed window of the first application program;
  if the determined number of fingers detected in the flicking is one, controls the touch screen to scroll content shown in the displayed window of the first application program in a direction of movement of the flicking;
  if the determined number of fingers detected in the flicking is four or more, determines whether a second application program is running;
  if the determined number of fingers is four or more and it is determined that a second application program is running, controls the touch screen to switch from the displayed window of the first application program to a window of the second application program; and
  if the determined number of fingers detected in the flicking is four or more and it is determined that a second application is not running, controls the apparatus to perform a default action, wherein the default action comprises at least one of scrolling content in the displayed window of the first application program, switching from a currently-displayed sub-window of the first application program to a not-currently-displayed sub-window of the first application program, and performing no action.

16. The apparatus of claim 15, wherein the controller, if the determined number of fingers detected in the flicking is two, controls the touch screen to switch from a currently-displayed sub-window of the displayed first application to a not-currently-displayed sub-window of the first application.

17. The apparatus of claim 16, wherein at least one of the sub-windows comprises a tab-window.

18. The apparatus of claim 15, wherein the flicking of one or more fingers in the displayed window of the first application program on the touch screen comprises at least one of a swipe and a drag.

19. A non-transitory machine-readable medium storing code which, when executed by one or more processors of an apparatus including a touch screen, implements the performance of a method comprising:
 displaying a window of a first application program on the touch screen;
 detecting a flicking of one or more fingers in the displayed window of the first application program on the touch screen;
 determining a number of fingers in the detected flicking of one or more fingers in the displayed window of the first application program on the touch screen; and
 if the determined number of fingers in the detected flicking is four or more:
  determining whether a second application program is running; and
  if it is determined that a second application is running, switching from the displayed window of the first application program to a window of the second application program; and
  if it is determined that a second application is not running, performing a default action, wherein the default action comprises at least one of scrolling content in the displayed window of the first application program, switching from a currently-displayed sub-window of the first application program to a not-currently-displayed sub-window of the first application program, and performing no action.

20. The non-transitory machine-readable medium of claim 19, wherein the method implemented by the stored code further comprises:
 if the determined number of fingers in the detected flicking is one, scrolling content shown in the displayed window of the first application program in a direction of movement of the one touch flicking.

21. The non-transitory machine-readable medium of claim 19, wherein the method implemented by the stored code further comprises:
 if the determined number of fingers in the detected flicking is two, switching from a currently-displayed sub-window of the displayed first application program to a not-currently-displayed sub-window of the displayed first application program.

22. The non-transitory machine-readable medium of claim 19, wherein the flicking of one or more fingers in the displayed window of the first application program on the touch screen comprises at least one of a swipe and a drag.

23. A method for a portable terminal with a touch screen, the method comprising:
   displaying a window of a first application program on the touch screen;
   detecting a flicking of one or more fingers in the displayed window of the first application program on the touch screen;
   determining a number of fingers in the detected flicking of one or more fingers in the displayed window of the first application program on the touch screen;
   determining a direction of movement of the one or more fingers in the detected flicking;
   when the determined number of fingers in the detected flicking is one:
      determining whether the first application program provides the capability for a user to scroll content in the displayed window; and
      if it is determined that the first application program provides the capability for a user to scroll content and there is content to be scrolled, scrolling content in the displayed window of the first application program in the determined direction of movement of the flicking; and
   when the determined number of fingers in the detected flicking is four or more:
      determining whether a second application program is running;
      if it is determined that a second application program is running, switching from the displayed window of the first application program to a window of the second application program by moving the displayed window of the first application program out of view in the determined direction of movement of the flicking; and
      if it is determined that a second application is not running, performing a default action, wherein the default action comprises at least one of scrolling content in the displayed window of the first application program, switching from a currently-displayed sub-window of the first application program to a not-currently-displayed sub-window of the first application program, and performing no action.

24. The method for a portable terminal of claim 23, wherein, if the determined number of fingers in the detected flicking is four or more and it is determined that a second application is running, the window of the second program application moves into view in the determined direction of movement of the flicking.

25. The method for a portable terminal of claim 24, wherein the window of the second program application moves into view in the determined direction of movement of the flicking at the same time as the displayed window of the first application program moves out of view in the determined direction of movement of the flicking.

26. The method for a portable terminal of claim 23, wherein, if the determined number of fingers in the detected flicking is four or more, it is determined that a second application is running, and the second program application has a currently open window, the displayed window of the first application program switches to the currently open window of the second application program by moving the displayed window of the first application program out of view in the determined direction of movement of the flicking.

27. The method for a portable terminal of claim 23, wherein the flicking of one or more fingers in the displayed window of the first application program on the touch screen comprises at least one of a swipe and a drag.

* * * * *